United States Patent Office 3,366,686
Patented Jan. 30, 1968

3,366,686
PROCESS FOR PREPARING PRIMARY AMINES
Robert W. Rosenthal, Pittsburgh, and Richard Seekircher, Gibsonia, Pa., assignors to Gulf Research & Development Company, Pittsburgh, Pa., a corporation of Delaware
No Drawing. Filed Nov. 23, 1964, Ser. No. 413,280
7 Claims. (Cl. 260—583)

ABSTRACT OF THE DISCLOSURE

A process which involves subjecting a paraffin hydrocarbon having from eight to seventy carbon atoms to nitration in the liquid phase with nitric acid or $NO_2$ to obtain a mixture containing nitroparaffins and ketones and then subjecting the mixture to reaction with hydrogen and ammonia in the presence of a hydrogenation catalyst to convert the nitroparaffins and ketones to the corresponding primary amines.

---

This invention relates to a process for preparing primary amines.

The process as defined herein preferably involves subjecting a paraffin or a mixture of paraffins to nitration to obtain a mixture containing nitroparaffins and ketones and thereafter subjecting said nitroparaffins and said ketones to reaction with hydrogen and ammonia in the presence of a hydrogenation catalyst to convert said nitroparaffins and said ketones to the corresponding primary amines.

Any paraffin or mixture of paraffins, normally liquid at atmospheric pressure and ambient temperature or liquid under the nitration conditions to be defined hereinafter can be employed in the process. Thus, paraffins having from eight to 70 carbon atoms or more, preferably from nine to 19 carbon atoms, are suitable. Examples of such paraffins are 2,6-dimethylheptane, n-octane, n-nonane, 3-methylnonane, n-dodecane, n-tetradecane, n-octadecane, n-eicosane, n-pentacosane, n-tricontane, n-tetracontane, n-pentacontane, n-tetrahexacontane, n-heptacontane, etc.

The nitration of the paraffin defined above is effected by contacting the same with a nitrating agent, such as nitric acid or $NO_2$. $NO_2$ can be added as either a liquid or a gas. Aqueous nitric acid having a concentration above about 35 percent and ranging up to anhydrous nitric acid can be employed, although aqueous nitric acid having a concentration of about 60 to about 70 percent is preferred. The amount of nitrating agent employed can vary over a wide range, but in general, the amount thereof will be about 10 to about 100 mol percent, preferably about 20 to about 50 mol percent, based on said paraffin. Reaction of the paraffin with the nitrating agent can be, for example, at a temperature of about 100° to about 300° C., but preferably, in the range of about 180° to about 210° C., and a pressure of about 0 to about 500 pounds per square inch gauge, preferably a pressure of about 0 to about 50 pounds per square inch gauge. Contact time is not critical, since the reaction between the paraffin and the nitrating agent is substantially instantaneous. Addition rate of the nitrating reagent can be from about 0.001 to about 0.1 mol per mol of paraffin per minute, preferably from about 0.002 to about 0.008 mol per mol of paraffin per minute.

The nitration reaction defined above is continued, for example, until about 10 to about 60 mol percent, preferably until about 20 to about 40 percent, of paraffin has been converted. Of the converted portion about 70 to about 80 mol percent thereof will be nitroparaffins, about 20 to about 30 mol percent thereof will be ketones, about five to about 10 mol percent thereof will be dinitroparaffins, and trace amounts of carboxylic acids may also be present. In the event $NO_2$ has been employed as the nitrating agent the amount of mononitroparaffins will be increased to about 85 to about 95 mol percent, while the ketones will be decreased to about five to about 15 mol percent by weight.

As pointed out above, nitration of the paraffin results substantially in the production of mononitroparaffins. These are substantially secondary nitroparaffins, since the nitro group will generally attach itself to a secondary carbon atom on the paraffin chain and only a small number of nitro groups will attach themselves to a terminal carbon atom on the paraffin chain. The carbonyl function on the ketone produced may be at any internal location thereon and the number of carbon atoms thereof will also correspond to the number of carbons on the paraffin. During the reactions gaseous $N_2O$, NO and water are also given off. Nitroparaffins that are produced herein include 1-nitrooctane, 2-nitrooctane, 3-nitrooctane, 4-nitrooctane, 2-nitrododecane, 3-nitrotridecane, 5-nitropentadecane, 3-nitroeicosane, 4-nitroeicosane, 1-nitroheptadecane, 2-nitroheptadecane, 3-nitrooctadecane, 4-nitrooctadecane, 1-nitroheptacontane, 2-nitroheptacontane, 21-nitroheptacontane, etc. Ketones that are produced herein include octanone-2, octanone-3, octanone-4, heptadecanone-2, heptadecanone-3, heptadecanone-4, heptadecanone-5, heptadecanone-6, heptadecanone-7, heptadecanone-8, heptadecanone-9, triacontanone-10, heptacontanone-21, etc.

In the second stage of the process the mononitroparaffins and ketones produced in the first stage thereof are subjected to reaction with hydrogen and ammonia in the presence of a hydrogenation catalyst to convert said nitroparaffins and ketones to the corresponding primary amines. This can be done, for example, by subjecting the entire reaction mixture obtained at the end of the first stage to such treatment, since the unreacted paraffin and carboxylic acid, if any, will be unaffected by the treatment and the dinitroparaffin will merely be converted to the corresponding diamine. However, in the case of the lower boiling paraffins, for example, from octane to at least eicosane, we prefer to subject only the mononitroparaffins and the ketones to such treatment. The recovery of the desired fraction to be treated from the product obtained at the end of the first stage can be effected in any desired manner. Thus, by flash distillation at a temperature of about 25° to about 150° C. and a pressure of about one to about 10 millimeters of mercury pressure, the unreacted paraffins can be removed from the reaction product. Further distillation of the remaining product at a temperature of about 100° to about 200° C. will result in recovery of the desired fraction containing nitroparaffins and ketones, leaving a residue of dinitroparaffins, carboxylic acids, if any, and other heavy material.

The reaction of the nitroparaffins and the ketones with hydrogen and ammonia in the presence of a hydrogenation catalyst can be effected in any suitable manner that will ensure contact of said reactants with each other and with the hydrogenation catalyst. The amount of ammonia required for the desired reaction will be at least about one mol per mol of said ketone, preferably about four to about 10 mols per mol of said ketone. The amount of hydrogen required will be at least about three mols per mol of said nitroparaffins and at least about one mol per mol of said ketones, although large excesses are preferred. The reaction can be carried out, for example, at a temperature of about 25° to about 200° C., preferably about 50° to about 100° C., and a pressure of about 100 to about 2000 pounds per square inch gauge, preferably about 300 to 700 pounds per square inch gauge. Reaction time can be, for example, from about five to about 120 minutes, preferably from about 15 to about 60 minutes. Any hydrogenation catalyst, such as Raney nickel, Raney cobalt, supported or modified nickel catalysts, platinum, etc., can be employed. The amount of catalyst employed, based on the nitroparaffin present, can be at least about one percent by weight, preferably from about two to about 20 percent by weight. The reaction is carried out in the presence of a solvent for the reactants and the reaction products. Examples of solvents that can be employed include methanol, ethanol, propanol, isopropanol, butanol, etc. Of these, we prefer to employ methanol and ethanol. The amount of solvent needed is that amount sufficient to solubilize the reactants and reaction products produced in the second stage of the process. This can be, for example, from about 1000 to about 3000 milliliters per total mols of nitroparaffins and ketones charged.

At the end of the second stage the nitroparaffins and the ketones have been converted to the corresponding primary amines. Examples of primary amines produced herein include 1-aminooctane, 2-aminooctane, 3-aminooctane, 4-aminooctane, 2-aminododecane, 3-aminotridecane, 5-aminopentadecane, 3-aminoeicosane, 4-aminoeicosane, 1-aminoheptadecane, 2 - aminoheptadecane, 3-aminooctadecane, 4 - aminooctadecane, 1-aminoheptacontane, 2-aminoheptacontane, 21 - aminoheptacontane, etc. These amines can be employed as cationic surface active agents, emulsifiers, microbicides and fungicides. Of particular interest is the fact that they can be methylated to dimethylaminoalkanes which can be oxidized with hydrogen peroxide to the amine oxide derivative thereof, a biodegradable, surface-active agent with high foam stability.

The primary amines are separated from the product at the end of the second stage in any convenient or suitable manner. Thus, for example, wherein the charge to the second stage included only nitroparaffins and ketones, the product at the end of the second stage is subjected to filtration to remove catalyst therefrom, and the remainder is then subjected to a temperature of about 25° to about 120° C. to flash off solvent therefrom. To the product left behind there is added water, for example, at least about two volumes per volume thereof, and a mineral acid, such as hydrochloric acid, in an amount stoichiometrically required to convert the amines to the corresponding amine salts. This can be done at a temperature of about 10° to about 30° C. and atmospheric pressure. The amine salts are soluble in the water, while the remaining materials are not soluble and will form a separate layer. The two layers are separated from each other in any convenient manner, for example, by decantation. To the clear aqueous layer containing the dissolved amine salt there is added at least the stoichiometric amount of a base, such as sodium hydroxide. This action releases the amine salt back to the corresponding amine which is insoluble in water and forms a separate layer. To recover the desired amine physical separation of the two layers, for example, decantation can be employed. Alternatively, the amine can be extracted with a suitable extractant, such as chloroform or ether. Distillation of the extractant from the extract leaves behind the desired amine.

We have found that the reaction in the second stage of the process must be carried out in the presence of both ammonia and hydrogen. When the reaction is carried out in the absence of ammonia and in the presence of hydrogen alone, not only is the ketone portion of the charge not converted to the corresponding amine, but the same will have a tendency to condensate with part of the amines formed to produce an imine, which in the presence of hydrogen would be reduced to undesirable high-boiling amines. Additionally, the amines formed can act as catalyst to favor the condensation of ketones with themselves. Further, the ketone will have a tendency to react with ammonia to form an imine and water. Since the latter reaction is reversible, it would be expected that the large amount of water formed in the hydrogenolysis of the nitroparaffin to the corresponding amine would tend to suppress the formation of the latter desired imine, which under the conditions employed would be hydrogenated to the desired amine. And yet, unexpectedly, by carrying out the reaction in the described manner, the undesired reactions described above apparently do not take place and the desired primary amines are produced.

The process of this invention can further be illustrated by the following:

EXAMPLE I

To 510 grams (three mols) of normal dodecane which had been heated to 180° C. and which was maintained at atmospheric pressure, there was added dropwise over a period of 90 minutes 90 grams (one mol) of 70 percent aqueous nitric acid. Gas-liquid chromatography of the product showed that there was 30 percent conversion of the dodecane and 75 percent molar efficiency to mononitrododecanes and 25 molar percent efficiency to dodecanones. The mixture was stirred overnight at a temperature of 25° C. with a 10 percent excess of a 15 percent by weight aqueous solution of potassium hydroxide and the aqueous layer that formed was separated. Neutralization of the aqueous layer with $CO_2$ followed by distillation yielded 145 grams of mononitrododecanes having boiling points of 130°–135° C. at five millimeters of mercury. Distillation of the organic layer yielded 41.5 grams of dodecanones having boiling points of 120°–132° C. at 17 millimeters of mercury. Molar efficiency to mononitrododecanes was therefore 74 percent, to dodecanones 24 percent.

EXAMPLE II

When the run of Example I was repeated using 1840 grams (10 mols) of tridecane and 160 milliliters (0.5 mol) of liquid $NO_2$, there was obtained 27.2 percent conversion of the tridecane, with 90.8 percent molar efficiency to mononitrotridecanes and 9.2 percent molar efficiency to tridecanones.

EXAMPLE III

A mixture containing 4.6 grams (0.025 mol) of 2-, 3-, 4-, 5- and 6-dodecanones and 16.1 grams (0.075 mol) of 1-, 2-, 3-, 4-, 5- and 6-nitrododecanes was dissolved in 175 milliliters (4.4 mols) of methanol containing 10 grams of ammonia and stirred at temperatures in the range of 30° to 100° C. and a hydrogen pressure of 450 pounds per square inch gauge for one hour in the presence of 10 grams of finely divided nickel (Girdler Nickel Catalyst 49B). At the end of this time, hydrogen absorption ceased. The reaction mixture was cooled to room temperature, filtered to remove nickel therefrom and stripped of methanol by heating at a temperature of 64° C. The residue was treated with 60 grams (0.1 mol) of dilute HCl, extracted with 100 milliliters of ether and the aqueous layer sprung with four grams (0.1 mol) of sodium hydroxide. There was found 14.9 grams of a mixture of 1-, 2-, 3-, 4-, 5- and 6-aminododecanes, which amounts to a yield of amine of 81 percent based on the total charge. Based on the nitrododecanes alone this amounts to a yield of 107 percent. This is clear evidence that not only the nitrododecanes were converted to the desired amines but so were the dodecanones.

That the mixture of nitroparaffins and ketones must be treated with both hydrogen and ammonia is apparent from the following:

EXAMPLE IV

A mixture containing 13.8 grams (0.075 mol) of 2-, 3-, 4-, 5- and 6-dodecanones and 48 grams (0.225 mol) of 1-, 2-, 3-, 4-, 5- and 6-nitrododecanes was dissolved in 600 milliliters (15 mols) of methanol and stirred at a temperature in the range of 24° to 40° C. and a hydrogen pressure of 700 pounds per square inch gauge for two hours in the presence of 30 grams of finely divided nickel (Girdler Nickel Catalyst 49A). At the end of this time, hydrogen absorption ceased. The reaction mixture was cooled to room temperature, filtered to remove nickel therefrom and stripped of methanol by heating at a temperature of 64° C. The residue was treated with 180 grams (0.3 mol) of dilute HCl, extracted with 300 milliliters of ether and the aqueous layer sprung with 12 grams (0.3 mol) of sodium hydroxide. There was found 55.5 grams of a mixture of 1-, 2-, 3-, 4-, 5- and 6-aminododecanes which amounts to a yield of 59.5 percent based on the total charge. Based on the nitrododecanes alone this amounts to a yield of 79 percent.

Obviously, many modifications and variations of the invention, as hereinabove set forth, can be made without departing from the spirit and scope thereof, and therefore only such limitations should be made as are indicated in the appended claims.

We claim:

1. A process comprising subjecting a paraffin having from eight to 70 carbon atoms in the liquid phase to nitration with a compound selected from the group consisting of nitric acid and $NO_2$ to obtain a mixture containing nitroparaffins and ketones, said nitroparaffins and said ketones having the same number of carbon atoms as said paraffin, and thereafter subjecting said nitroparaffins and said ketones to reaction with hydrogen and ammonia in the presence of a hydrogenation catalyst to convert said nitroparaffins and said ketones to the corresponding primary amines.

2. A process comprising subjecting a paraffin having from eight to 70 carbon atoms in the liquid phase to nitration with a compound selected from the group consisting of nitric acid and $NO_2$ at a temperature of about 100° to about 300° C. to obtain a mixture containing nitroparaffins and ketones, said nitroparaffins and said ketones having the same number of carbon atoms as said paraffin, and thereafter subjecting said nitroparaffins and said ketones to reaction with hydrogen and ammonia in the presence of a hydrogenation catalyst to convert said nitroparaffins and said ketones to the corresponding primary amines.

3. A process comprising subjecting a paraffin having from eight to 70 carbon atoms in the liquid phase to nitration with a compound selected from the group consisting of nitric acid and $NO_2$ at a temperature of about 100° to about 300° C. to obtain a mixture containing nitroparaffins and ketones, said nitroparaffins and said ketones having the same number of carbon atoms as said paraffin, and thereafter subjecting said nitroparaffins and said ketones to reaction with hydrogen and ammonia in the presence of a hydrogenation catalyst to convert said nitroparaffins and said ketones to the corresponding primary amines at a temperature of about 25° to about 200° C.

4. A process comprising subjecting a paraffin having from eight to 70 carbon atoms in the liquid phase to nitration with nitric acid having a concentration of about 35 to about 100 percent at a temperature of about 100° to about 300° C. to obtain a mixture containing about 70 to about 80 mol percent of at least one nitroparaffin and about 20 to about 30 mol percent of at least one ketone, said nitroparaffin and said ketone having the same number of carbon atoms as said paraffin, and thereafter subjecting the nitroparaffins and the ketones so obtained to reaction with at least about three mols of hydrogen per mol of said nitroparaffins and at least about one mol of hydrogen per mol of said ketones and at least about one mol of ammonia per mol of said ketones in the presence of at least about one percent by weight of a hydrogenation catalyst at a temperature of about 25° to about 200° C. and a pressure of about 100 to about 2000 pounds per square inch gauge to convert said nitroparaffins and said ketones to the corresponding primary amines.

5. A process comprising subjecting a paraffin having from eight to 70 carbon atoms in the liquid phase to nitration with nitric acid having a concentration of about 35 to about 100 percent at a temperature of about 100° to about 300° C. to obtain a mixture containing about 70 to about 80 mol percent of at least one nitroparaffin and about 20 to about 30 mol percent of at least one ketone, said nitroparaffin and said ketone having the same number of carbon atoms as said paraffin, and thereafter subjecting the nitroparaffins and the ketones so obtained to reaction with at least about three mols of hydrogen per mol of said nitroparaffins and at least about one mol of hydrogen per mol of said ketones and at least about one mol of ammonia per mol of said ketones in the presence of at least about one percent by weight of nickel at a temperature of about 25° to about 200° C. and a pressure of about 100 to about 2000 pounds per square inch gauge to convert said nitroparaffins and said ketones to the corresponding primary amines.

6. A process comprising subjecting a paraffin having from eight to 70 carbon atoms in the liquid phase to nitration with $NO_2$ at a temperature of about 100° to about 300° C. to obtain a mixture containing about 85 to about 95 mol percent of at least one nitroparaffin and about five to about 15 mol percent of at least one ketone, said nitroparaffin and said ketone having the same number of carbon atoms as said paraffin, and thereafter subjecting the nitroparaffins and the ketones so obtained to reaction with at least about three mols of hydrogen per mol of said nitroparaffins and at least about one mol of hydrogen per mol of said ketones and at least about one mol of ammonia per mol of said ketones in the presence of at least about one percent by weight of a hydrogenation catalyst at a temperature of about 25° to about 200° C. and a pressure of about 100 to about 2000 pounds per square inch gauge to convert said nitroparaffins and said ketones to the corresponding primary amines.

7. A process comprising subjecting a paraffin having from eight to 70 carbon atoms in the liquid phase to nitration with $NO_2$ at a temperature of about 100° to about 300° C. to obtain a mixture containing about 85 to about 95 mol percent of at least one nitroparaffin and about five to about 15 mol percent of at least one ketone, said nitroparaffin and said ketone having the same number of carbon atoms as said paraffin, and thereafter subjecting the nitroparaffins and the ketones so obtained to reaction with at least about three mols of hydrogen per mol of said nitroparaffins and at least about one mol of hydrogen per mol of said ketones and at least about one mol of ammonia per mol of said ketones in the presence of at least about one percent by weight of nickel at a temperature of about 25° to about 200° C. and a pressure of about 100 to about 2000 pounds per square inch gauge to convert said nitroparaffins and said ketones to the corresponding primary amines.

References Cited

UNITED STATES PATENTS

| | | | |
|---|---|---|---|
| 2,174,498 | 9/1939 | Johnson | 260—583 |
| 2,213,444 | 9/1940 | Johnson | 260—644 |
| 2,278,372 | 3/1942 | Olin et al. | 260—583 |
| 2,350,318 | 5/1944 | Shonle et al. | |

FLOYD D. HIGEL, *Primary Examiner.*